United States Patent [19]

Kohlhammer

[11] 3,778,644

[45] Dec. 11, 1973

[54] FILTER CIRCUIT

[75] Inventor: Bernd Kohlhammer, Markbronn, Germany

[73] Assignee: LICENTIA Patent-Verwaltungs GmbH, Frankfurt am Main, Germany

[22] Filed: Oct. 18, 1971

[21] Appl. No.: 189,975

[30] Foreign Application Priority Data

| | | |
|---|---|---|
| Oct. 17, 1970 | Germany | P 20 51 061.6 |
| Nov. 16, 1970 | Germany | P 20 56 204.3 |
| Feb. 17, 1971 | Germany | P 21 07 523.0 |

[52] U.S. Cl. ................................ 307/295, 333/80 R

[51] Int. Cl. .......................... H03h 7/02, H03h 7/44

[58] Field of Search ........................ 333/80 R, 80 T; 330/22, 107, 109; 323/22 T, 22 R; 307/295; 328/167

[56] References Cited

UNITED STATES PATENTS 3,618,133 11/1971 Gingell ............................ 333/80 R

OTHER PUBLICATIONS

Moschutz, Inductorless Filters: A Survey, Part II, IEEE Spectrum, Sept. 1970, pp. 63 & 65 relied on.

*Primary Examiner*—Paul L. Gensler
*Attorney*—George H. Spencer et al.

[57] ABSTRACT

A filter circuit formed with a plurality of gyrators and a plurality of impedances. Each of the gyrators has a pair of input terminals and a pair of output terminals. At least one of the gyrators is a bridging gyrator which bridges an odd number of the remaining gyrators . One input terminal and one output terminal of each gyrator are connected to a point of reference potential.

19 Claims, 12 Drawing Figures

FILTER CIRCUIT

BACKGROUND OF THE INVENTION

This invention relates to a filter circuit formed with gyrators and impedances. The invention more particularly relates to a filter circuit formed with gyrators and capacitances.

Due to the increasing miniaturization of the components and devices in the communications art and the electronic art, the integrated technique has been developed during the past years to an extraordinary extent. A large difficulty arises, however, in the integration of filters whose attenuation frequency characteristics have steep edges since the coils and other inductive members required for such filters cannot be integrated.

The gyrator, introduced by B. D. H. Telegen in the four-terminal theory, is a four-terminal network which converts a primary voltage applied to its two input terminals at a certain conversion ratio into a secondary current which flows through the terminal impedance at its two output terminals and conversely it converts a secondary voltage applied to its two output terminals into a primary current which flows through the input operating impedance at its two input terminals. The gyrator has the property, which is particularly important in practice, that a capacitance connected to its output is so transformed that an inductive reactance appears at the input of the gyrator.

A known transistorized gyrator circuit, which may be used in practicing the present invention, is described by W. H. Holmes, R. Grutzmann and W. E. Heinlein in Electronics Letters, Vol. 3, No. 2, page 46 (1967). This known circuit principally consists of two two-stage, antiparallel connected amplifiers. It will be appreciated that other known gyrators, including those which provide amplification and/or limiting may be used as well.

When gyrators are used in filters, the procedure has been such that all coils in conventional reactance circuits comprising coils and capacitances are replaced by gyrators and capacitances. In such a case, the connections of the input terminals and the output terminals of the gyrators are often made to circuit points which all are high electrically compared to a reference potential (ground). This is a drawback since modern gyrators can be realized with active elements, particularly transistors and the like, which require an electric current supply. With the input and output terminals of the gyrators all connected to circuit points above reference potential (ground), the current supply can be effected only with the aid of additional, often complex, circuitry if the desired filter characteristics are not to be undesirably influenced.

SUMMARY OF THE INVENTION

It is an object of the present invention to provide a filter circuit having a plurality of gyrators all of which may be operated with an input terminal and an output terminal at a reference potential.

It is another object of the present invention to provide a filter circuit having a plurality of gyrators, at least one being a bridging gyrator.

It is a further object of the present invention to provide a filter circuit which is free of coils and uses gyrators which may be operated from a simple power supply.

It is an additional object of the present invention to provide a filter circuit which is particularly suitable for use in an integrated circuit.

It is yet another object of the present invention to provide filter circuit which is canonical with respect to the gyrators in the circuit.

It is yet a further object of the present invention to provide a filter circuit which is canonical with respect to capacitances in the circuit.

These and other objects of the present invention are accomplished by providing a filter circuit formed with a plurality of gyrators, each having a pair of input terminals and a pair of output terminals, and a plurality of impedances. At least one of the gyrators in a bridging gyrator which bridges an odd number of the remaining gyrators. One input terminal and one output terminal of each gyrator are connected to a point of reference potential.

DESCRIPTION OF THE PREFERRED EMBODIMENTS

Figure 1:
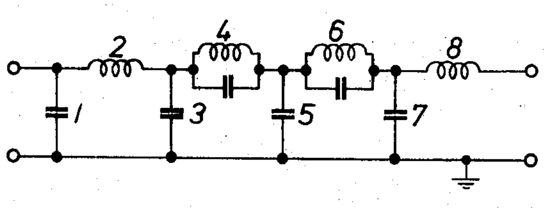
FIG. 1 PRIOR ART
FIG. 1 is a schematic diagram of a known lowpass filter.

FIG. 1 shows an example of a known, conventional lowpass filter circuit of the eighth order with four shunt capacitances 1, 3, 5 and 7 in which a coil 2 is connected in an upper ground-free longitudinal branch of the filter circuit between the shunt capacitances 1 and 3. A parallel resonant circuit 4 is connected between the shunt capacitances 3 and 5 in the upper ground-free branch of the circuit. A parallel resonant circuit 6 is connected between the shunt capacitances 5 and 7 in the ground-free branch. A coil 8 is connected between the parallel resonant circuit 6 and a hot (ungrounded) output terminal of the filter circuit. The lower continuous longitudinal branch of the lowpass filter circuit is at ground potential.

Figure 2:
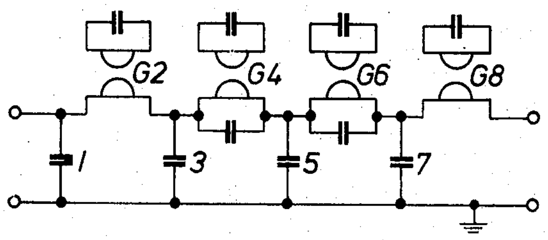
FIG. 2 PRIOR ART
FIG. 2 is a schematic diagram of a known lowpass filter which is the equivalent of the circuit of FIG. 1.

FIG. 2 shows a prior art equivalent filter circuit to the circuit of FIG. 1 in which the coil 2 (FIG. 1), the coils of the parallel resonant circuits 4 and 6 (FIG. 1) and the coil 8 (FIG. 1) have been replaced at the output side by a plurality of gyrators G2, G4, G6 and G8, shown diagrammatically, each being terminated by an individual capacitor.

As can be seen, all of the input terminals of the gyrators G2, G4, G6 and G8 are connected to circuit points which are all above ground potential. This is a serious drawback since most modern gyrators are constructed as active elements which require a power supply; e.g., transistors which require a current supply.

This drawback can be overcome according to the present invention in that a filter circuit is provided with a basic chain in which, in the direction of the chain, $n$ gyrators alternate with shunt and/or series capacitances and in which further bridging gyrators are provided for the even numbered or odd numbered values of $n$, the maximum being $n/2 - 1$ or $(n-1)/2$, respectively. These bridging gyrators are so connected that they each bridge an odd number of gyrators of the basic chain, at least three of them, and that all gyrators and bridging gyrators are grounded at both ends.

It can be shown by calculations that the filter circuit structure according to the invention permits the realization of any desired transmission functions or reactance matrices as filters.

A particular advantage is that the filter circuits according to the present invention can be brought into canon with respect to the capacitances as well as with respect to the gyrators, i.e., that only as many capacitances and gyrators are required as corresponds to the degree of the transmission function to be realized by the filter so that a minimum possible number of capacitances and gyrators is sufficient.

The known filter circuit of FIG. 2 which is equivalent to the lowpass filter circuit of the eighth order as shown in FIG. 1 is, for example, not canonical with reference to the capacitances because it requires four ungrounded gyrators and ten capacitances.

A further advantage of filter circuits according to the present invention is that they can be designed with the aid of a simple method. It is here of no importance whether minimum-phase or all-pass-type reactance transmission functions are involved.

Figure 3:
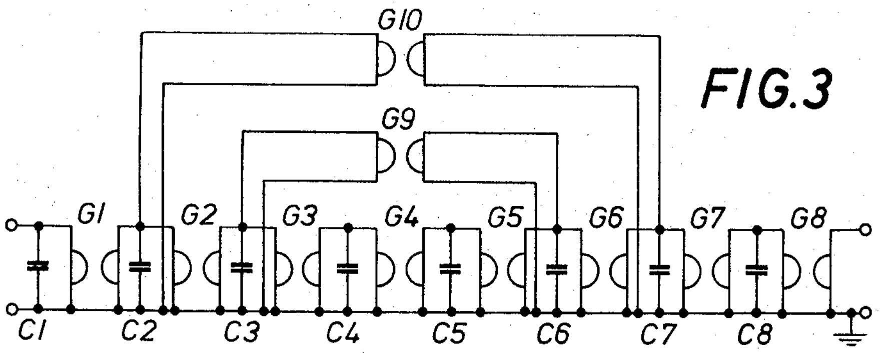
FIG. 3 is a schematic diagram of an exemplary lowpass filter circuit according to the present invention.

The circuit according to the present invention as shown in FIG. 3 includes a basic chain formed with shunt capacitances C1 to C8 and gyrators G1 to G8 which alternate with one another in the direction of the chain. The lower terminals of the shunt capacitances C1 to C8 and the gyrators G1 to G8 are all at ground potential. Two bridging gyrators G9 and G10 are provided. The bridging gyrator G9 bridges the three basic chain gyrators G3, G4 and G5, one of the two input terminals and one of the two output terminals of this bridging gyrator G9 lying at ground potential and the other two ground-free terminals being connected, respectively, with the corresponding, ground-free terminals of the gyrators G3 and G5, or the shunt capacitances C3 and C6. The other bridging gyrator G10 bridges the basic chain gyrators G2 to G6, one of the two input terminals and one of the two output terminals of this bridging gyrator G10 being at ground potential and the other two ground-free terminals being connected with the corresponding ground-free terminals of the basic chain gyrators G2 and G6 or the shunt capacitances C2 and C7, respectively.

The basic chain gyrator G8 can also be omitted, if desired, without the characteristics of the lowpass filter changing much. The lowpass filter circuit of FIG. 3 thus requires 10 or nine, respectively, gyrators which are grounded at both ends and eight capacitances. It is thus canonical regarding the capacitances.

Figure 4:
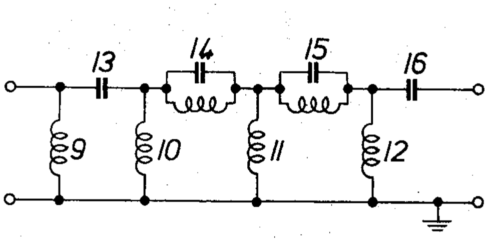
FIG. 4 PRIOR ART
FIG. 4 is a schematic diagram of a known highpass filter.

FIG. 4 shows a known, conventional highpass filter of the eighth order which corresponds to the lowpass filter of FIG. 1. The highpass filter has four shunt inductances 9, 10, 11 and 12 whose lower terminals, which are connected with the continuous line, are at ground potential. In a ground-free branch a capacitance 13 is connected between the corresponding ground-free terminals of the inductances 9 and 10, a parallel resonant circuit 14 or 15, respectively, is connected between each of the ground-free terminals of the inductances 10 and 11, or 11 and 12, respectively, and a series capacitance 16 is connected between the ground-free terminal of the inductance 12 and the hot (ungrounded) output terminal of the filter circuit.

Figure 5:
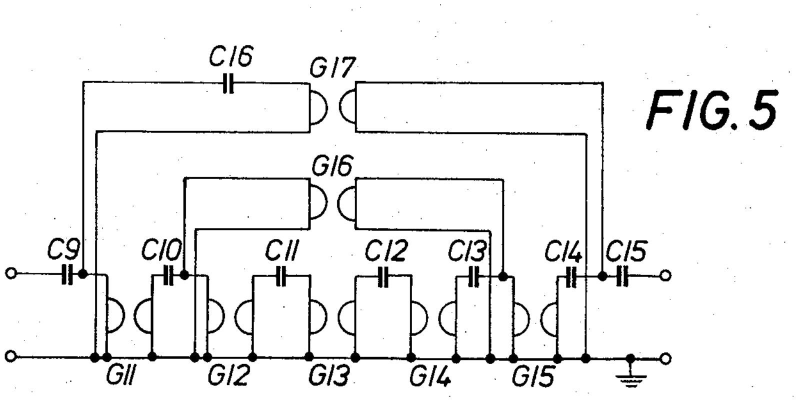
FIG. 5 is a schematic diagram of an exemplary highpass filter according to the present invention.

FIG. 5 shows a highpass filter circuit according to the present invention which includes five gyrators G11 to G15, seven series capacitances C9 to C15 coupled as a basic chain, and two bridging gyrators G16 and G17. The bridging gyrator G16 bridges the three inner basic chain gyrators G12, G13 and G14, and the bridging gyrator G17 bridges all five basic chain gyrators G11 to G15. A series capacitance C16 is additionally connected in the ground-free connecting line of the bridging gyrator G17. Such series capacitances can also be connected into other or all other connecting lines of the two bridging gyrators G16 and G17. As shown, one input terminal and one output terminal of each of the gyrators G11 to G17 are connected to points of ground potential.

Figure 6:
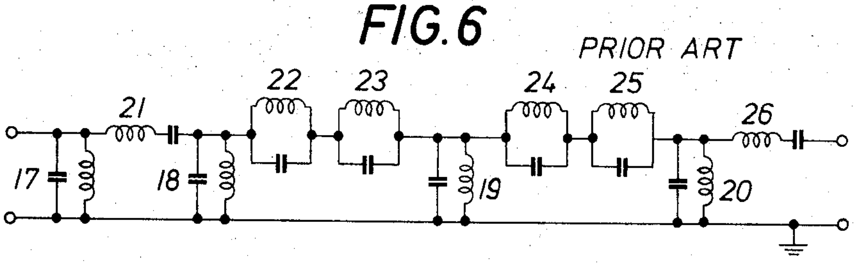
FIG. 6 PRIOR ART
FIG. 6 is a schematic diagram of a known bandpass filter.

FIG. 6 shows a known, conventional bandpass filter of the sixteenth order which comprises four transverse branch parallel resonant circuits 17 to 20. In a ground-free branch between the corresponding ground-free terminals of the parallel resonant circuits 17 and 18, a series resonance circuit 21 is connected. An arrangement of two series connected parallel resonant circuits 22 and 23 or 24 and 25, respectively, is provided between the ground-free terminals of the parallel resonant circuits 18 and 19 or 19 and 20, respectively. A series resonant circuit 26 is connected between the ground-free terminal of the parallel resonance circuit 20 and one output terminal of the bandpass filter, the other output terminal being at a point of ground potential.

Figure 7:
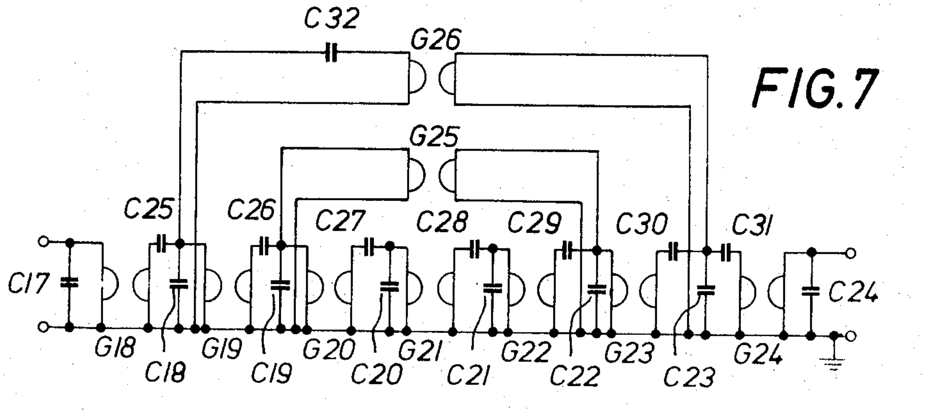
FIG. 7 is a schematic diagram of an exemplary bandpass filter according to the present invention.

FIG. 7 shows a bandpass circuit according to the present invention which includes seven gyrators G18 to G24, eight shunt capacitances C17 to C24 and seven series capacitances C25 to C31 in a basic chain. Two bridging gyrators G25 and G26 are provided. The bridging gyrator G25 bridges the inner three basic chain gyrators G20–G22. The bridging gyrator G26 bridges the inner five basic chain gyrators G19–G23. In the one groundfree connecting line of bridging gyrator G26 lies a series capacitor C32. One input terminal and one output terminal of each of the gyrators G18–G26 are connected to points of ground potential.

Figure 8:
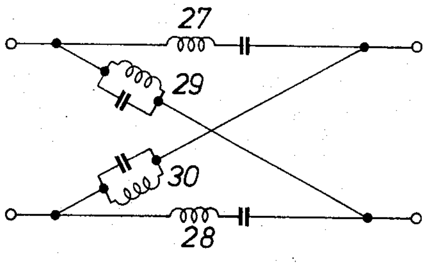
FIG. 8 PRIOR ART
FIG. 8 is a schematic diagram of a known allpass filter.

FIG. 8 shows a known, conventional allpass filter of the second order in the form of a bridge which is provided, in two oppositely disposed bridge branches, with a series resonant circuit 27 or 28, respectively, and in the other two bridge branches with a parallel resonant circuit 29 or 30, respectively. The two diagonals of the bridge are the input and output terminals of the allpass filter.

Figure 9:
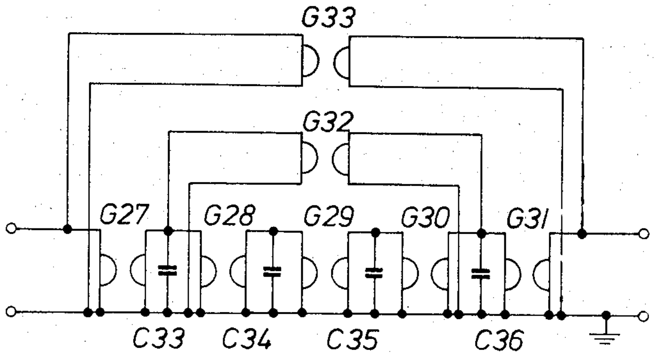
FIG. 9 is a schematic diagram of a first exemplary allpass filter according to the present invention.

FIG. 9 shows a first allpass filter circuit according to the present invention which includes five basic chain gyrators G27 to G31, four shunt capacitances C33 to C36 and two bridging gyrators G32 and G33. The bridging gyrators G32 or G33 bridge the three inner basic chain gyrators G28–G30 or all of the basic chain gyrators G27–G31, respectively. No capacitances are connected in parallel with the terminals of the outer bridging gyrator G33. One input terminal and one output terminal of each of the gyrators G27–G33 are connected to points of ground potential.

Figure 10:
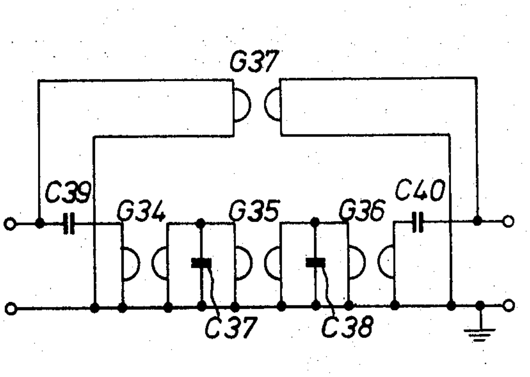
FIG. 10 is a schematic diagram of a second exemplary all pass filter according to the present invention.

FIG. 10 shows a second allpass filter circuit according to the present invention which comprises only three basic chain gyrators G34 to G36, two shunt capacitances C37 and C38, two series capacitances C39 and C40 and a single bridging gyrator G37 which bridges the three basic chain gyrators G34 to G36. The filter circuit requires three gyrators less than the circuit according to FIG. 9. No capacitances are connected in parallel with the terminals of the bridging gyrator. One input terminal and one output terminal of each of the gyrators G34–G37 are connected to points of ground potential.

Figure 11:
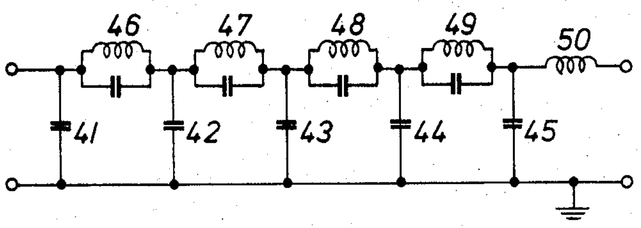
FIG. 11 PRIOR ART
FIG. 11 is a schematic diagram of a known lowpass filter circuit.

FIG. 11 shows the example of a known, conventional lowpass filter circuit of the tenth order which comprises shunt capacitances 41, 42, 43, 44 and 45, parallel resonant circuits 46, 47, 48 and 49 which are connected in series with one another in a ground-free branch, each of the resonant circuits 46–49 being connected between connecting points of two adjacent capacitances of the shunt capacitances 41–45. A coil 50 is connected from the ground-free terminal of the shunt capacitance 45 to an output terminal of the lowpass filter, the other output terminal being at ground potential. The lower continuous line of the filter is at ground potential.

Figure 12:
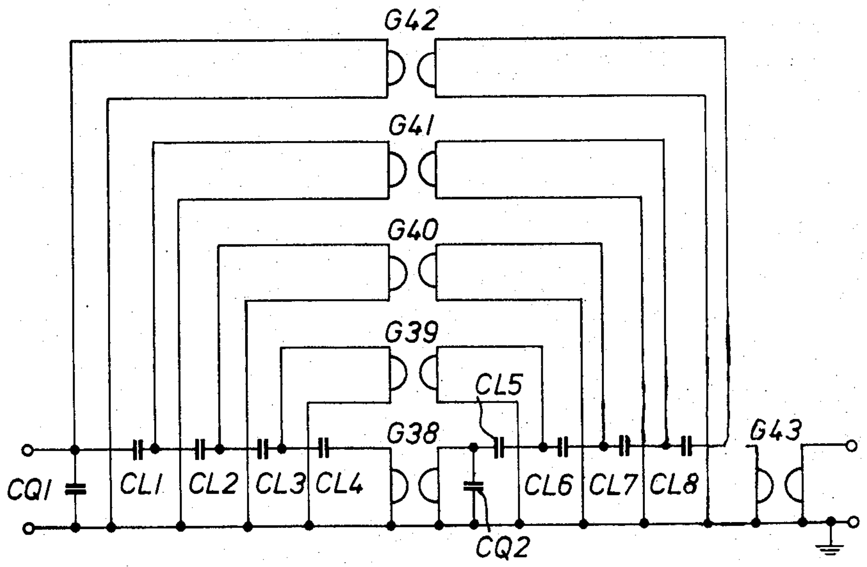
FIG. 12 is a schematic diagram of a further exemplary lowpass filter according to the present invention.

FIG. 12 shows a lowpass filter circuit according to the present invention which includes a basic chain of two parts which are connected together via a gyrator G38 grounded at both ends. The input part consists of a shunt capacitance CQ1 and a series connection of four series capacitances CL1, CL2, CL3 and CL4. The other part, at the output side, comprises a shunt capacitance CQ2 and the series connection of four series capacitances CL5, CL6, CL7, and CL8. A plurality of bridging gyrators G39, G40 and G41 are connected via their ground-free terminals between the series capacitances CL3/CL4 or CL5/CL6, respectively, CL2/CL3 or CL6/CL7, respectively, and CL1/CL2 or CL7/CL8, respectively. An outer further bridging gyrator G42 is connected with its ground-free terminals to a ground-free input terminal of the filter circuit or to a ground-free input terminal of a gyrator G43, respectively. An input terminal and an output terminal of each of the gyrators G38–G43 are connected to points of ground potential. In this filter circuit, in which the gyrator G43 can also be omitted without there being any substantial change in the filter characteristics, five grounded gyrators G38–G42 and only 10 capacitances CQ1, CQ2 and CL1–CL8 are required. The circuit is canonical with respect to the gyrators as well as with respect to the capacitances.

It is particularly advisable to dimension the basic chain in the filter circuit of the present invention in such a way that their shunt capacitances are identical and/or that their series capacitances are identical and/or that their gyrators are identical.

For technical reasons it may be advisable under certain circumstances to design the filter circuit according to the present invention so that a coil may be present additionally at the input and/or output terminals of the circuit, which is used, for example, for adaptation to further circuit components as a transformer. It is also possible to design only parts of filter circuits in accordance with the present invention so that, for example, a chain circuit is used which consists of filter circuits according to the invention and of different types of filter circuits.

The filter circuit according to the present invention can also be used in combination with a conventional filter, if required.

A substantial advantage of the filter circuit of the present invention is that the gyrators may be so designed that they have amplifier characteristics. Thus integrated filter-amplifier circuits can be constructed in accordance with the present invention. The great drawback of conventional gyrator circuits is in many fields of application the high amount of energy consumed by the gyrators, particularly for applications in portable electronic devices which are independent of fluctuations in the line voltage. This drawback can be eliminated in the filter circuit of the present invention by the simultaneous use of the gyrators as impedance transforming elements and amplifier elements. The use of gyrators as amplifier elements is disclosed in the following two articles: Active Gyrator by Yanagisawa and Kawashina in Electronics Letters published March 1967 and Ersatz van Induktivitaten durch Halbleiterschaltungen (Replacement of Inductances by Semiconductor Circuits) by Gensel in Nachrichtentechik published August 1967.

In addition to the realization of lowpass filters, highpass filters and bandpass filters as they were discussed above, for example, the filter circuit according to the present invention can also be used for the realization of any desired reactance filters, particularly of notch filters and the like as will be readily apparent to those skilled in the electronic arts.

A particularly favorable field of application for integratable filter circuits with gyrators is the radio receiver art. In the previous receiver concepts, selector means and amplifiers were not separated but rather simple two-circuit or three-circuit coupled filters alternated with amplifier stages. This has the advantage, particularly for the reception of frequency modulated transmissions that the amplifier stages within the circuit could be so designed that they act as limiters, as taught by the article Die Wirkungsweise und das verhalten eines integrierten, direktgekoppelten Gyrators (The Operation and Behavior of an Integrated, Direct-coupled Gyrator) by Herchner and Minner in Frequenz published August 1970, of the interfering amplitude modulations.

The above-mentioned circuit arrangement, however, has not heretofore been applicable in the integrated technique because the advantage of integration is evident only with amplification. This means, at the same time, that selection must also be provided. With the conventional circuit concepts this removes the possibility of amplitude limitation.

This drawback is eliminated in integratable filter circuits constructed in accordance with the present invention from gyrators and capacitances in that the gyrators are readily designed to serve as amplitude limiters. Similarly as in the conventional circuit the limitation can then again take place within the selection circuit.

It will be understood that the above description of the present invention is susceptible to various modifications, changes and adaptations and the same are intended to be comprehended within the meaning and range of equivalents of the appended claims.

I claim:

1. In a filter circuit having a plurality of gyrators, each having a pair of input terminals and a pair of output terminals, and a plurality of capacitances, the improvement wherein a first number of said plurality of gyrators are coupled in the form of a basic chain via said capacitances, and a second remaining number of said plurality of gyrators bridge an odd number of said first number of said plurality of gyrators, and that only one input terminal and one output terminal of each gyrator are connected to a point of reference potential, thereby providing an asymmetrical connection for each of said gyrators.

2. The filter circuit as defined in claim 1 wherein said capacitances are each connected respectively in shunt with the input terminals of individual ones of said plurality of gyrators.

3. The filter circuit as defined in claim 2 wherein all the shunt connected capacitances in the basic chain are identical.

4. The filter circuit as defined in claim 1 wherein said capacitances are each connected respectively in series with the input terminals of individual ones of said plurality of gyrators.

5. The filter circuit as defined in claim 4 wherein all the series connected capacitances are identical.

6. The filter circuit as defined in claim 1 wherein some of said capacitances are each connected respectively in shunt with the input terminals of individual ones of said plurality of gyrators, and others of said capacitances are each connected respectively in series with the input terminals of different individual ones of said plurality of gyrators.

7. The filter circuit as defined in claim 6 wherein all the shunt connected capacitances in the basic chain are identical and all of the series connected capacitances are identical.

8. The filter circuit as defined in claim 1 wherein said capacitances are each comprised of a first capacitive portion, and a second capacitive portion, the first capacitive portion of each capacitance being connected respectively in series with the input terminals of individual ones of said plurality of gyrators and the second capacitive portion of each capacitance being connected respectively in shunt with the input terminals of said individual ones of said plurality of gyrators.

9. The filter circuit as defined in claim 1 including an additional capacitance connected in series with a reference-free terminal of the at least one bridging gyrator.

10. The filter circuit as defined in claim 1 wherein the number of said capacitances required by the filter circuit corresponds to the degree of the transmission function to be realized by the filter circuit.

11. The filter circuit as defined in claim 10 wherein the number of said gyrators required by the filter circuit corresponds to the degree of the transmission function to be realized by the filter circuit.

12. The filter circuit as defined in claim 1 wherein the number of said gyrators required by the filter circuit corresponds to the degree of the transmission function to be realized by the filter circuit.

13. The filter circuit as defined in claim 1 wherein at least one of the gyrators is an amplifier whereby the circuit exhibits amplifier characteristics in addition to desired filter characteristics.

14. The filter circuit as defined in claim 1 wherein all gyrators in the basic chain are identical.

15. The filter circuit as defined in claim 1 wherein at least one of the gyrators is an amplitude limiter whereby the circuit exhibits limiter characteristics in addition to desired filter characteristics.

16. The filter circuit as defined in claim 1 wherein the first number of said gyrators, which form the basic chain, are $n$ in number, $n$ being an even number, and the maximum number of bridging gyrators is $n/2 - 1$.

17. The filter circuit as defined in claim 1 wherein the first number of said gyrators, which form the basic chain, are $n$ in number, $n$ being an odd number, and the maximum number of bridging gyrators is $(n-1)/2$.

18. The filter circuit as defined in claim 1 wherein the reference potential is ground.

19. In a filter circuit in the form of an integrated circuit having a plurality of gyrators, each having a pair of input terminals and a pair of output terminals, and a plurality of capacitances, the improvement wherein a first number of said plurality of gyrators are coupled in the form of a basic chain via said capacitances, and a second remaining number of said plurality of gyrators bridge an odd number of said first number of said plurality of gyrators, and that only one input terminal and one output terminal of each gyrator are connected to a point of reference potential, thereby providing an asymmetrical connection for each of said gyrators.

* * * * *